Aug. 8, 1933.  G. R. UNKEFER  1,921,176
LURE
Filed May 27, 1931

Inventor
George R. Unkefer
By
Atty

Patented Aug. 8, 1933

1,921,176

UNITED STATES PATENT OFFICE 1,921,176

LURE

George R. Unkefer, Chicago, Ill.

Application May 27, 1931. Serial No. 540,386

7 Claims. (Cl. 43—46)

This invention relates to lures more particularly for fishing, and, among other objects, aims to provide an attractive and yet inexpensive simulation of a minnow or the like which can be easily and securely attached to a fishhook and which will have a lifelike appearance when being drawn through the water on the hook.

My invention may be understood by reference to the illustrative embodiment thereof shown in the accompanying drawing, in which—

Figure 1:
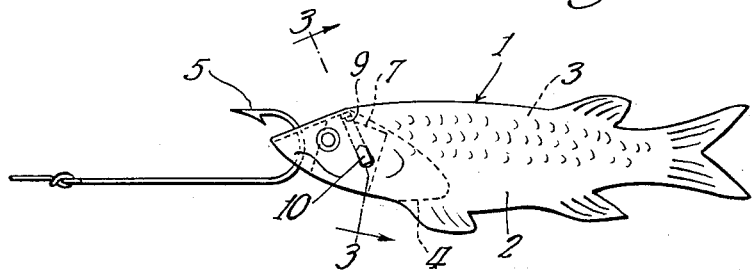
Figure 1 is a side elevation of a lure made in accordance with my invention, and showing it attached to a fishhook.

Referring in general to the drawing, I have illustrated the production and use of a lure made in accordance with my invention simulating the appearance, for example, of a minnow 1.

Figure 4:
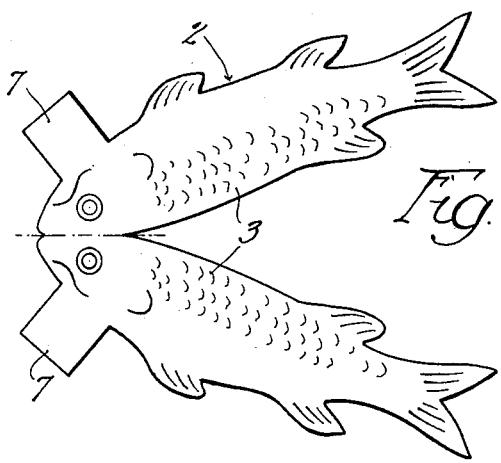
Figure 4 is a preferred intermediate step in the production of my improved lure, showing a plan view of one of the parts before it is folded.

Figure 4 shows a preferred intermediate step in the production of the minnow 1. As clearly shown by this view, a pictorial representation of the minnow is imprinted upon a material 2, which may be cut or stamped out to conform to the two sides of the minnow, both sides of the minnow being printed with the same design 3 (which may be appropriately colored) and the design being arranged so that when the material 2 is folded, as presently described, both sides of the minnow will be simulated.

The material 2 is desirably waterproof at least to the extent of having the capacity of retaining its body for a considerable length of time after being immersed in water, and the ink or the like with which the design is produced, is also desirably water resistant. I choose for the material 2 furthermore, a material which is transparent and highly flexible, for reasons presently set forth, and have found that a thin cellulose material formed from solidified viscose such as the material known as cellophane is well adapted for my purpose since it has substantially all the qualities desired.

Figure 2:
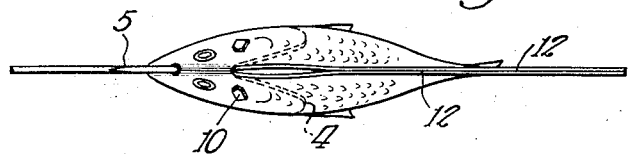
Figure 2 is a plan view of the structure shown in Figure 1.
Figure 3:
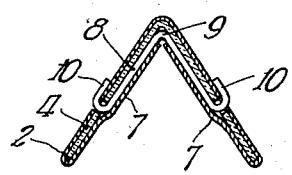
Figure 3 is a sectional view taken on the line 3—3 of Figure 1.
Figure 5:
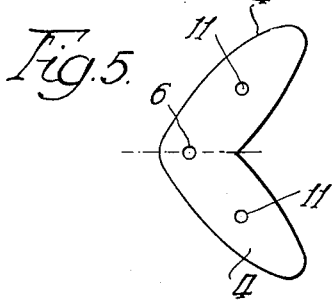
Figure 5 is a plan view before it is folded of a preferred reinforcement for the head of the lure.

I next fold the material 2 upon itself (with the printed surfaces toward each other) from the position shown in Figure 4 to that shown in Figures 1, 2 and 3, so that the design 3 is upon the inner surface of the fold and thus is visible through the material 2. In this way, the lure is given a sheen which simulates the natural scaly appearance of a fish and greatly enhances the lifelikeness of the lure.

In order to strengthen the head of the minnow, I provide a reinforcement made of a material preferably somewhat heavier than the first mentioned material. For this reinforcement I may cut a piece of raw-hide 4, for example, to conform somewhat to the shape of the two sides of the head of the minnow. As is clearly shown in the drawing, the reinforcement 4 is inserted between the folds of the head of the minnow and is secured thereto by a waterproof glue, for instance. The raw-hide is desirably flexible and has the quality of softening in water to enhance the lifelikeness of the lure, while at the same time having a toughness and elasticity which permits the lure to be securely attached to a fishhook 5, the latter, as here shown, passing through a hole 6 in the nose of the reinforcement 4, and piercing the material 2. So constructed the hole 6 may elongate in use due to the pull of the hook without danger of the lure breaking away from the hook.

Flaps 7 which are desirably provided upon the material 2, are folded about the reinforcement 4 terminating well within the bight of the fold. These flaps not only assist in securing the reinforcement to the material 2 but also prevent the lower edge of the material 2 from working away from the reinforcement.

To further stabilize the form of the minnow, and to secure the parts firmly together, I have shown a clip 8 disposed within the fold of the head and engaging the materials 2 and 4. The clip 8 has a bight 9 which follows the fold of the materials and ends 10 which may pass through holes 11 in the reinforcement 4, pierce the material 2, fold back upon themselves and be clinched upon the material 2 and the reinforcement 4. This clip is desirably of metal of low or substantially no resiliency, so that the clip and consequently the head of the minnow, will retain the shape given it when once folded, as already described. My invention contemplates that the lure shall be open at its bottom edge and have its sides inclined away from each other. In this fold, the sides are preferably not pressed down upon each other, but extend at an angle from each other, as shown in Figure 3, whereby the sides of the fold have the effect somewhat of fins, which tend to maintain the minnow in an upright position and substantially in line with the hook 5 when passing through water. So constructed and arranged, I have found also that air is entrapped in the bight of the fold which further serves to stabilize the lure and maintain its lifelike appearance.

The tail portion may be tacked together, for example, by a small amount of waterproof glue smeared along the margins of the material 2 as at 12.

The cellulose material which I prefer to use for the material 2 has sufficient body to maintain its form in water and yet is sufficiently flexible so that the tail of the lure will sway back and forth at the slightest movement through the water, giving an extremely lifelike appearance to the lure.

Having described one embodiment of my invention I claim:

1. As an article of manufacture, a fish lure comprising a transparent flexible material having the design of a minnow imprinted upon one surface thereof, said material being folded upon itself to the shape of a minnow, the design being imprinted on each side of the minnow and being visible through the material; and a reinforcement of heavier material for the head of the minnow.

2. As an article of manufacture, a fish lure comprising a transparent flexible material having the design of a minnow imprinted upon one surface thereof, said material being folded upon itself to the shape of a minnow, the design being imprinted on each side of the minnow and being visible through the material; a reinforcement for the head of the minnow embodying a flexible material heavier than the first mentioned material; and a member clipping the reinforcement and the first mentioned material together.

3. As an article of manufacture, a fish lure simulating an artificial minnow comprising a transparent substantially waterproof flexible material carrying a design of both sides of a minnow imprinted upon one surface thereof, the material being folded upon itself to the shape of a minnow, the design being visible through the material; a reinforcement for the head of the minnow embodying a flexible waterproof material tougher than the first mentioned material, said reinforcement being shaped to conform substantially to the head of the minnow and being inserted between the folds of the head, and a substantially non-resilient metal member having a bight portion following the interior lines of the fold of the head and ends piercing the reinforcement and the first mentioned material and clinched thereupon.

4. The article of claim 3 wherein the reinforcement has a hole therethrough substantially in the line of the fold for the insertion of a fishhook.

5. The article of claim 3 wherein the first mentioned material is cut with flaps which may be folded about the reinforcement.

6. As an article of manufacture, a fish lure comprising a blank having similarly shaped portions connected along a median line of the blank, said portions being bent toward each other to form the two sides of the lure, and a substantially non-resilient metallic bar disposed transversely of the blank and engaging the said sides, said bar being bendable to maintain the sides in selective angular relation.

7. As an article of manufacture, a fish lure comprising a blank having similarly shaped portions connected along a median line of the blank, said portions simulating the sides of a minnow, means for maintaining the said sides for a portion of their length in spread apart angular relation, whereby the lure is open along its bottom edge in the region of the head of the minnow, and means for maintaining the said sides in close intimacy in the region of the tail of the minnow.

GEORGE R. UNKEFER.